United States Patent [19]

Pasquali et al.

[11] Patent Number: 4,666,751

[45] Date of Patent: May 19, 1987

[54] SELF-ADHESIVE MATERIAL AND METHOD FOR THE MANUFACTURE THEREOF

[76] Inventors: Jean-Claude Pasquali, 47, rue Basse, 91650 Bouray-sur-Juine; Jean-Claude Binet, 6, rue Pablo Picasso, 94000 Creteil, both of France

[21] Appl. No.: 598,506

[22] Filed: Apr. 9, 1984

[30] Foreign Application Priority Data

Aug. 8, 1983 [FR] France ................................ 83 05795

[51] Int. Cl.⁴ .............................................. B32B 3/24
[52] U.S. Cl. ........................................ 428/40; 156/247;
156/289; 156/291; 428/138; 428/247; 428/255
[58] Field of Search ............... 156/230, 240, 247, 289,
156/291; 428/40, 109, 110, 111, 247, 255, 352,
354, 202

[56] References Cited

U.S. PATENT DOCUMENTS

| | | | |
|---|---|---|---|
| 3,183,142 | 5/1965 | Tierney | 428/109 |
| 3,442,750 | 5/1969 | Wilcox | 428/109 |
| 3,597,299 | 8/1971 | Thomas et al. | 428/109 X |
| 3,669,804 | 6/1972 | Clausen et al. | 156/558 X |
| 3,741,786 | 6/1973 | Torrey | 428/202 X |
| 3,873,405 | 3/1975 | Wilkes | 428/40 X |
| 3,999,949 | 12/1976 | Andersson et al. | 428/40 X |
| 4,214,024 | 7/1980 | Jacobson | 428/202 X |

Primary Examiner—Robert A. Dawson
Attorney, Agent, or Firm—Fred A. Keire

[57] ABSTRACT

A self-adhesive product is formed of at least one material (8) and an adhesive composition deposited onto the material (8). The ratio of the adherent surface, namely the total adhesive contact surface, to the application surface, namely the surface to which the self-adhesive product is applied, is less than 1. The adhesive composition deposited on the material (8) is such that the total surface on which the adhesive material is deposited is less than the surface of the material.

9 Claims, 4 Drawing Figures

SELF-ADHESIVE MATERIAL AND METHOD FOR THE MANUFACTURE THEREOF

The present invention concerns a new self-adhesive material and a method for the manufacture thereof.

Materials are known onto which an adhesive composition which confers adhesive power to the surfaces to which it is applied is deposited by coating. This deposit is generally spread uniformly over the application surface, making said surface uniformly adhesive with an adhesive power which is directly proportional to the area of said surface.

The adhesive power of these materials is, therefore, also directly proportional to the width of use. This adherence is expressed as linear adhesive power in accordance with the standards which express the force which must be applied linearly in order to detach the material from the support to which it has been adhered.

The adhesive compositions which can be used at the present time in order to impart permanent adhesive power to materials intended for use as self-adhesives provide a linear adhesive power which is generally between about 50 and 800 g/cm, depending on their nature. It must be borne in mind that below 150 g/cm, adherence is practically non-existent except on certain supports such as marble, glass and metal.

If one takes as example a material having an average adhesive power which is about 350 g/cm, the force necessary in order to remove such a material is about 3.5 kg if used in a width of 10 cm and 35 kg if applied over a width of 1 meter.

It can be noted from this example that even when the necessary force is available practically all materials used for self-adhesives are films whose fragility does not withstand such stresses (paper, plastic films), which makes them unusable beyond a width of 10 cm.

Now in numerous applications, products are desired which have good adherence but can nevertheless be easily detached even if they are applied over large surfaces. It is at present difficult or even impossible to obtain self-adhesive products whose force of adherence is not directly proportional to the area of application.

The present invention is directed at overcoming these drawbacks.

The object of the invention is to produce self-adhesive materials having an adhesion surface which is smaller than the application surface so as to avoid having the adhesive power of the adhesive composition used develop in a manner directly proportional to the application surface.

Another object of the invention is to provide a method of manufacturing easily detachable self-adhesive products used in large width.

The self-adhesive products of the invention are such that the ratio of the adherence surface to the application surface is always less than 1.

Thus the adhesive composition is deposited on the material which is to be made self-adhesive in such a manner that the area of the deposit is less than the area of the material on which said composition is applied. The adhesive power of this composition is thereby distributed over a surface which is smaller than the surface to which it is applied.

Thus if a perforated support is used as support onto which the adhesive composition is deposited, the adhesive surface is less than the entire surface of said support.

The product of the invention is preferably formed of at least one material whose surface is discontinuous and onto which the adhesive is applied. More preferably, the product according to the invention is formed of a perforated flexible material, for instance a grid or netting, formed of warp and filling threads.

The invention furthermore concerns a method of manufacturing a self-adhesive product. This process is such that an adhesive composition is applied onto a discontinuous surface.

This application may be random or in accordance with a given distribution.

The adhesive composition may be applied by dipping the support in a solution, emulsion or dispersion of said composition, while quantitatively controlling the distribution of the deposit by calendering or blowing.

Finally, the discontinuous support can be placed on a flat sheet to which it adheres, for instance paper, or on a sheet to which it does not adhere, for instance a silicone-treated sheet. The adhesive can also be transferred from the discontinuous support to a continuous surface.

Finally, the adhesive composition and its perforated support, or else the adhesive composition alone transferred from the perforated support, is made integral, by drying, with the sheet so as to obtain the self-adhesive material.

The following description, read with reference to the accompanying drawings which are given by way of illustration and not of limitation, will make it possible to understand how the invention can be carried out in practice.

Figure 1:
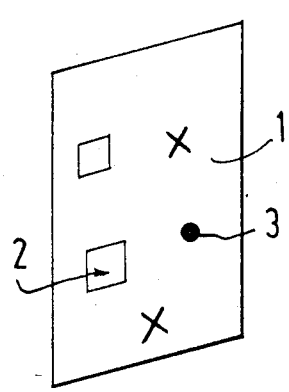
FIG. 1 is a diagrammatic view of the application surface and the adherence surface of a self-adhesive product according to the invention.
Figure 2:
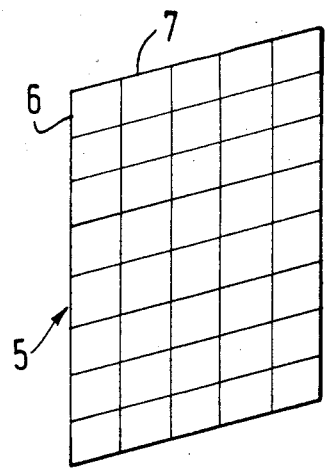
FIG. 2 is a diagrammatic view of a manner of producing the self-adhesive product.
Figure 3:
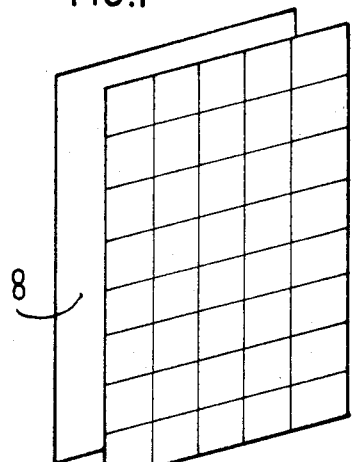
FIG. 3 is a diagrammatic view of a third embodiment, in an exploded view.
Figure 4:
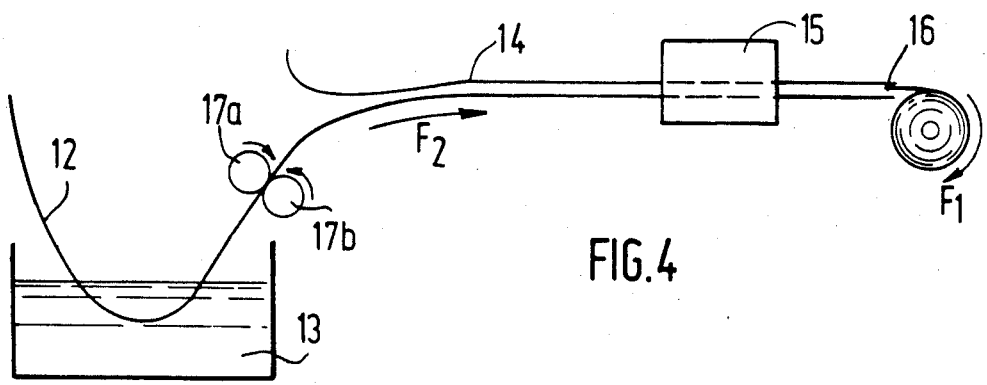
FIG. 4 is a view of the apparatus used for the manufacture of the product of the invention.

In FIG. 1 shows the application surface (Sappl) 1 and the adhesion surface 2 (Sad). The surface to which the self-adhesive material produced in accordance with the invention is applied is referred to as the application surface. This surface may be any desired but, more particularly, it is substantially flat.

It may be a wall, a floor or a ceiling of a room which is to be provided, temporarily or permanently, with, for instance, wall paper or fabric or else with a protection of thick paper.

The total adhesive-coated contact surface is referred to as the adhesion surface 2. This adhesion surface is such, according to the invention, that the ratio of the adhesion surface Sad to the application surface Sappl is less than 1. We can therefore write:

$$Sad/Sappl < 1$$

In accordance with the invention this ratio is not equal to 1.

In fact, when Sad/Sappl is equal to 1, we have a prior-art product.

The adhesion surface 2 is preferably discontinuous. For example, the adhesion surface 2 may be formed of points 3 distributed at random.

In accordance with a preferred embodiment of the invention, the self-adhesive product is formed of at least one perforated support 5, preferably flexible, in particular a gridwork consisting of filling threads 6 and warp threads 7. The grid is substantially flat and is flexible in a direction perpendicular to its plane.

It is preferably non-stretchable in the direction of the filling threads and of the warp threads. The filling and warp threads are, for instance, parallel to each other respectively and form parallelograms, in particular rectangles or squares. They may possibly be curved.

An adhesive which coats the filling and warp threads is deposited on this perforated material 5.

In such case, the surface of the grid 5 which acts as support is less than the application surface, namely the surface to which the self-adhesive material is applied. In fact, if the grid has a length L and a width l then the surface of application will be L×l while the surface of the ....warp and filling threads is far less.

According to another embodiment of the invention, the self-adhesive material is formed of a perforated flexible support 5 coated with an adhesive composition and of at least one sheet constituting the material 8 and arranged against one face of the flexible support 5.

In this case, the application surface 1 to which the self-adhesive material is applied is equal to the entire surface of the material 8.

More preferably, the adhesive product is formed of a flexible support 5 coated with an adhesive composition and placed between two flat sheets 8. These sheets, for instance, consist of heavy paper, fabric or a sheet of synthetic material on which the adhesive-coated grids may or may not be fastened.

According to one embodiment, the self-adhesive material is formed of a sheet to which the adhesive-coated grid 5 adheres firmly and of a sheet to which the grid 5 adheres poorly, for instance a silicone-coated sheet.

Thus one can employ a "sandwich" formed of a fabric or wall paper, of an adhesive-coated grid 5 and of a silicone-treated paper. One then obtains a product which is useful for interior decoration.

Finally, in accordance with another embodiment, one can provide a sheet onto which an adhesive composition is arranged at specified points, for instance arranged in accordance with a pattern of rectangular or square meshes, the sheet not having any grid proper. The pattern may be formed by contacting the sheet with a perforated support coated an adhesive composition. The adhesive composition is thereby applied to the sheet, and then the sheet and the perforated support are separated. Thus, the adhesive composition is transferred from the perforated support to the sheet. If the sheet and the perforated support are not separated, a laminated article, such as those described above, may be produced.

A process for the manufacture of a self-adhesive product according to the invention is characterized by applying an adhesive at individual points to a material 8.

An open-work or perforated support 12, e.g., a grid, is immersed in the adhesive composition 13 which is in the form of a solution, emulsion or suspension, the excess adhesive composition 13 is removed from the support 12, the adhesive composition is transferred from the support onto at least one sheet 14 so that the sum of the areas covered by the adhesive composition is less than the surface of the sheet 14.

The adhesive composition is preferably transferred by a transfer process. In this way there is obtained a self-adhesive material which is formed of a sheet and of an adhesive composition transferred at given points to said sheet.

In accordance with another embodiment, the support 12 which has been coated with an adhesive composition is placed on top of at least one sheet 14 and the package is then passed into a furnace 15 which is located downstream and permits fixing by drying.

Finally, the self-adhesive product 16 obtained is wound into a roll 17.

As the roll 17 rotates in the direction indicated by the arrow $F_1$, the sheets 14 respectively and the material 12 are driven in the direction of the arrow $F_2$.

The excess adhesive composition can be removed by means of two cylinders or masses 17a, 17b located at the outlet from the adhesive bath 13 or else by blowing, or by both simultaneously.

The first sheet 14 is preferably a sheet of paper, fabric or plastic film to which the flexible material 12 coated with an adhesive composition adheres, while the second or backing sheet is a silicone-treated sheet to which the flexible support 12 adheres slightly or very little.

According to the invention, one obtains a self-adhesive product 16 which may comprise an adhesive composition of high adhesive power which is proportionally distributed as a function of the desired linear adhesive power, whatever the area of the application surface.

Thus, the smaller the sum of the adhesion surfaces, the more one can use an adhesive composition of high adhesive power. One can therefore regulate the linear adhesive power, and do so independently of the surface of application.

In order to modify the adhesion surface one can — for instance in the case of a grid — change the distance between the warp threads and the filling threads respectively.

Another manner of manufacturing of the self-adhesive material of the invention is to spray an adhesive onto a support 1 at random points 3.

The self-adhesive product of the invention may be formed of an adhesive-coated flexible grid, the grid being applied to an anti-adherent material which has been silicone-treated, for instance, in order to protect it upon the winding up thereof. This grid can also be applied to any material and after the anti-adhesion protection has been withdrawn, another material can be applied to the other face of the grid, the grid thus acting as self-adhesive assembling product.

We claim:

1. A self-adhesive article, comprising: a first substantially flat sheet, a second substantially flat sheet, and a perforated support, said perforated support being located between said first and second sheets, said perforated support being entirely coated with an adhesive having a greater adherence to the first sheet than to the second sheet, the perforated support applying the adhesive to the first sheet, the second sheet being removable from the perforated support and from the first sheet.

2. A self-adhesive article as recited in claim 1, wherein said perforated support is a grid.

3. A self-adhesive articles as recited in claim 1, wherein said perforated support is netting formed of warp and filling threads.

4. A method of manufacturing a self-adhesive article having a substantially flat sheet and a perforated support coated entirely with an adhesive, comprising the steps of:

entirely coating the perforated support with the adhesive; and contacting the substantially flat sheet with the perforated support.

5. A method as recited in claim 4, wherein the coating step includes immersing the perforated support in a supply of the adhesive and removing an excess amount of the adhesive from the perforated support after the applying step.

6. A method as recited in claim 4, further comprising the step of heating the substantially flat sheet and the perforated support to dry and fix the adhesive.

7. A method of manufacturing a self-adhesive article having a first substantially flat sheet, a second substantially flat sheet, and a perforated support coated entirely with an adhesive, the perforated support being located between the first sheet and the second sheet, the second sheet being removable, comprising the steps of:
  entirely coating the perforated support with the adhesive;
  contacting the first sheet witht the perforated support; and
  contacting the perforated support with the second sheet.

8. A method as recited in claim 7, wherein the coating step includes immersing the perforated support in a supply of the adhesive and removing an excess amount of the adhesive from the perforated support after the applying step.

9. A method as recited in claim 7, further comprising the step of heating the first and second sheets and the adhesive to dry and fix the adhesive.

* * * * *